United States Patent
Min (10) Patent No.: US 7,369,486 B2
(45) Date of Patent: May 6, 2008

(54) APPARATUS AND METHOD FOR INCREASING CHANNEL CAPACITY OF A MOBILE COMMUNICATION SYSTEM

(75) Inventor: Kyung-Ho Min, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 956 days.

(21) Appl. No.: 10/630,721

(22) Filed: Jul. 31, 2003

(65) Prior Publication Data
US 2004/0032838 A1 Feb. 19, 2004

(30) Foreign Application Priority Data
Aug. 16, 2002 (KR) ............ 10-2002-0048420

(51) Int. Cl.
*H04J 11/00* (2006.01)
(52) U.S. Cl. .............................. 370/209; 370/342
(58) Field of Classification Search ............. 370/208, 370/209, 335, 342, 441; 375/140, 141
See application file for complete search history.

(56) References Cited

U.S. PATENT DOCUMENTS

| | | | | |
|---|---|---|---|---|
| 5,926,500 A | 7/1999 | Odenwalder | ............ | 375/200 |
| 6,515,978 B1* | 2/2003 | Buehrer et al. | ............ | 370/342 |
| 7,123,579 B1* | 10/2006 | Lyu | ............ | 370/203 |
| 2002/0021683 A1* | 2/2002 | Holtzman et al. | ............ | 370/335 |

FOREIGN PATENT DOCUMENTS

| | | |
|---|---|---|
| EP | 0924870 A1 | 6/1999 |
| JP | 1999-298378 | 10/1999 |
| JP | 2002-033716 | 1/2002 |
| KR | 2002-0004992 | 1/2002 |
| KR | 2002-0041641 | 6/2002 |

\* cited by examiner

*Primary Examiner*—Chau Nguyen
*Assistant Examiner*—Kenneth R Hartmann
(74) *Attorney, Agent, or Firm*—KED & Associates, LLP (57) ABSTRACT

An apparatus for increasing channel capacity in a mobile communication system using a hybrid phase shift keying (HPSK) modulation method. The method includes a walsh code control unit for checking sequences of walsh codes respectively outputted from a first walsh code unit and a second walsh code unit, a walsh rotator for generating a plurality of repeated complex functions and outputting them and a rotator control unit for selecting the repeated complex functions outputted from the walsh rotator according to the sequence of the walsh codes outputted from the first walsh code unit and the second walsh code unit. The method can use all walsh codes and increase reverse channel capacity.

17 Claims, 8 Drawing Sheets

FIG. 1
CONVENTIONAL ART

SET 1:  $(1)$

SET 2: $\begin{matrix} W_0 \\ W_1 \end{matrix} \begin{pmatrix} 1 & 1 \\ 1 & -1 \end{pmatrix}$

SET 4: $\begin{matrix} W_0 \\ W_1 \\ W_2 \\ W_3 \end{matrix} \begin{pmatrix} \begin{pmatrix} 1 & 1 \\ 1 & -1 \end{pmatrix} & \begin{pmatrix} 1 & 1 \\ 1 & -1 \end{pmatrix} \\ \begin{pmatrix} 1 & 1 \\ 1 & -1 \end{pmatrix} & \begin{pmatrix} -1 & -1 \\ -1 & 1 \end{pmatrix} \end{pmatrix}$ SET 8: $\begin{matrix} W_0 \\ W_1 \\ W_2 \\ W_3 \\ W_4 \\ W_5 \\ W_6 \\ W_7 \end{matrix} \begin{pmatrix} \begin{pmatrix} 1 & 1 & 1 & 1 \\ 1 & -1 & 1 & -1 \\ 1 & 1 & -1 & -1 \\ 1 & -1 & -1 & 1 \\ 1 & 1 & 1 & 1 \\ 1 & -1 & 1 & -1 \\ 1 & 1 & -1 & -1 \\ 1 & -1 & -1 & 1 \end{pmatrix} & \begin{pmatrix} 1 & 1 & 1 & 1 \\ 1 & -1 & 1 & -1 \\ 1 & 1 & -1 & -1 \\ 1 & -1 & -1 & 1 \\ -1 & -1 & -1 & -1 \\ -1 & 1 & -1 & 1 \\ -1 & -1 & 1 & 1 \\ -1 & 1 & 1 & -1 \end{pmatrix} \end{pmatrix}$

FIG. 2A
CONVENTIONAL ART
I/Q MEASURED POLAR VECTOR

FIG. 2B
CONVENTIONAL ART
I/Q MEASURED POLAR VECTOR

APPARATUS AND METHOD FOR INCREASING CHANNEL CAPACITY OF A MOBILE COMMUNICATION SYSTEM

BACKGROUND OF THE INVENTION

1. Field of the Invention

The present invention relates to an apparatus and method for increasing channel capacity of a mobile communication system. More particularly, the present invention relates to an apparatus and method using a hybrid phase shift keying (HPSK) modulation system.

2. Background of the Related Art

A code division multiple access (CDMA) is a method for detecting an original signal sent after spreading/modulating the signal using a specific code, and demodulating the spread/modulated signal by using an identical code as the code used in a sending side. A pseudo noise code composed of random numbers or a walsh code can be used as the specific code.

The walsh code is a kind of orthogonal code having almost no mutual relationship among codes, and since a communication channel is allotted to each unit, identical frequency resources can be allotted to many channels. That is, the channels of the walsh code can be easily classified by orthogonality, and the code can be applied to a phase shift keying (PSK), such as a quadrature PSK (QPSK) or a hybrid PSK (HPSK).

FIG. 1 shows a general walsh code is composed of a plurality of sets. As shown in FIG. 1, the walsh code of a first set is composed of "1", and the walsh code of a second set is composed of two walsh codes of {1, 1} of W0 and {1, −1} of W1. In addition, the walsh code of a fourth set includes four walsh codes composed of {1, 1, 1, 1} of W0, {1, −1, 1, −1} of W1, {1, 1, −1, −1} of W2 and {1, −1, −1, 1} of W3, and the walsh code of an eighth set includes eight walsh codes composed of {1, 1, 1, 1, 1, 1, 1, 1} of W0, {1, −1, 1, −1, 1, −1, 1, −1} of W1, {1, 1, −1, −1, 1, 1, −1, −1} of W2, {1, −1, −1, 1, 1, −1, −1, 1} of W3, {1, 1, 1, 1, −1, −1, −1, −1} of W4, {1, −1, 1, −1, −1, 1, −1, 1} of W5, {1, 1, −1, −1, −1, −1, 1, 1} of W6 and {1, −1, −1, 1, −1, 1, 1, −1} of W7. That is, the walsh codes can be increased as 2n sets according to necessity of a user.

Figure 2A:
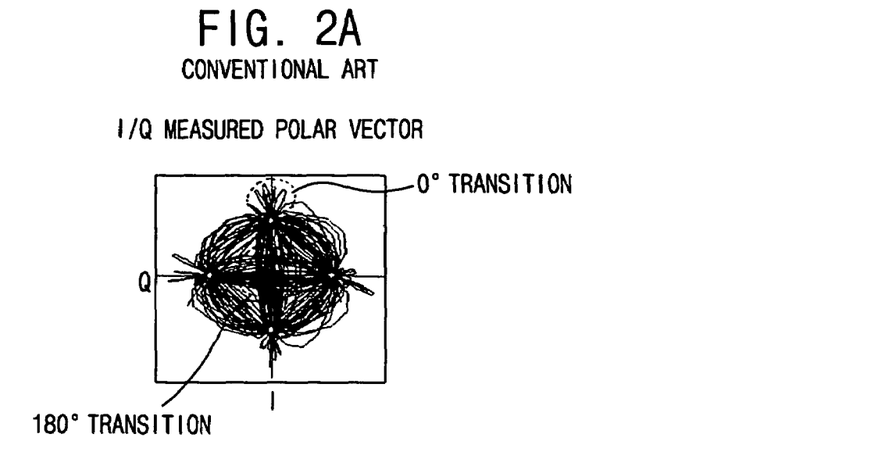
FIGS. 2A, 2B and 2C are views comparing transition status of quadrature phase shift keying (QPSK) and hybrid phase shift keying (HPSK)
Figure 2B:
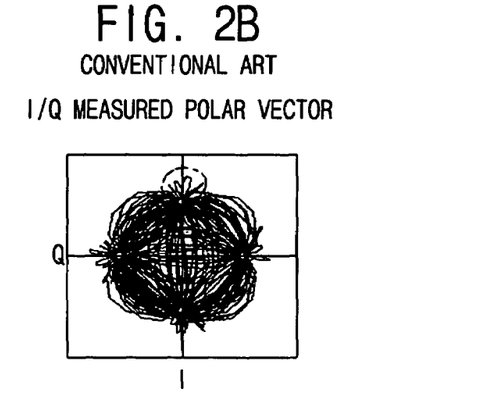
Figure 2C:
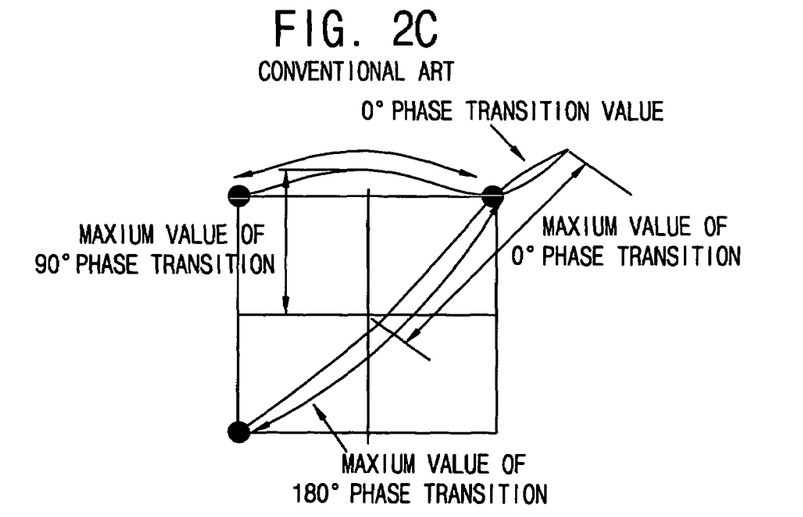

FIGS. 2A, 2B and 2C are views illustrating a transition status of the QPSK and HPSK spread signals. FIG. 2A is a view showing a phase transition status of the QPSK spread signal, FIG. 2B is a view showing a phase transition status of the HPSK spread signal and FIG. 2C is a view showing the size change of signals generated in each phase transition.

As shown in FIGS. 2A and 2B, in the QPSK spread, a peak power value increases at a 0° phase transition and phase changes by 180° phase transition are frequently generated. In the HPSK spread, a peak power value by the 0° phase transition is relatively lower than in the QPSK spread and phase changes by 180° phase transition are less frequently generated.

As shown in FIG. 2C, in the 0° phase transition, overshoot is generated at the peak power and the peak power value is increased, and in the 180° phase transition, a severe change of the power is generated. When the peak power is high, a power amplifier with a high output power must be designed, and since heat is generated in the system in proportion to the high output power, a cooling device is needed, thus increasing the size. Since frequency of generation of the 0° or 180° phase transition can be reduced by using the HPSK spread rather than using the QPSK spread, design of the amplifier can be eased by having smaller overshoot of the power generated 0° phase transition or smaller change of the power generated in case of the 180° phase transition.

Figure 3:
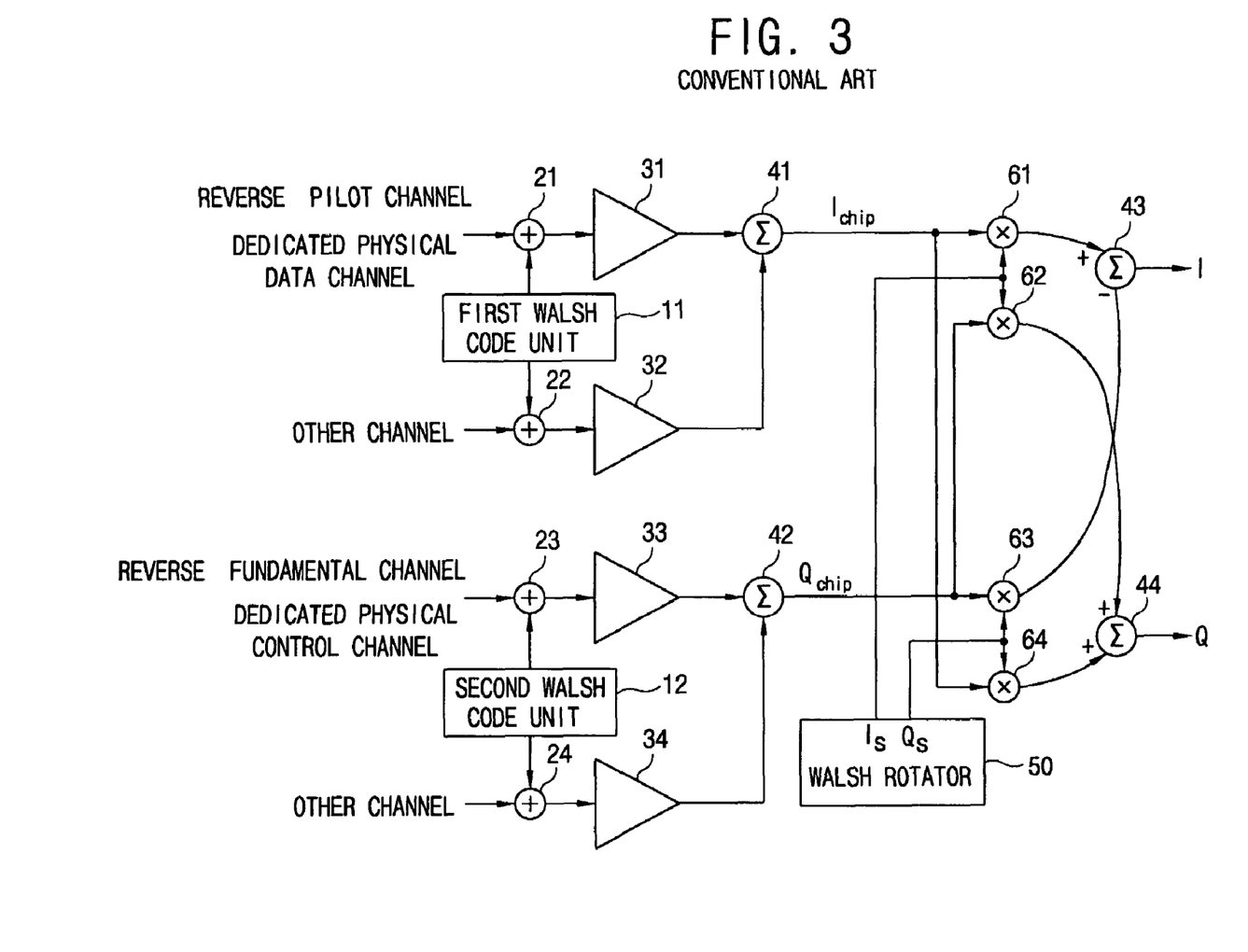
FIG. 3 is a view showing an apparatus for increasing channel capacity in the mobile communication system in accordance with the conventional art.

FIG. 3 is a view showing an apparatus for increasing channel capacity of a mobile communication system in accordance with the conventional art. The apparatus is a device for spreading a reverse walsh code in a 3rd generation (3G) system which uses the HPSK. The 3G system is a mobile communication system for providing communication services of a motion picture level, such as wideband-CDMA (W-CDMA) or CDMA-2000.

As shown in FIG. 3, the apparatus includes first and second walsh code units 11 and 12 for generating a plurality walsh codes, a first adder 21 for adding a specific walsh code inputted from the first walsh code unit 11 and a signal inputted through a reverse pilot channel (R-pilot CH.) or a dedicated physical data channel (DPDCH), and a second adder 22 for adding a signal of another data channel and a signal inputted from the first walsh code unit 11. The apparatus also includes first and second gain units 31 and 32 for outputting output signals of the first and second adder 21 and 22 by respectively gain-amplifying, a first sum unit 41 for summing the output signals of the first and second gain units 31 and 32 and outputting the result, a third adder 23 for adding a specific walsh code inputted from the second walsh code unit 12 and a signal inputted through a reverse fundamental channel (R-FCH) or a dedicated physical control channel (DPCCH), a fourth adder 24 for adding a signal of another channel and a signal inputted from the second walsh code unit 12, third and fourth gain units 33 and 34 for outputting output signals of the third and fourth adder 23 and 24 by respectively gain-amplifying, a second sum unit 42 for summing the output signals of the third and fourth gain units 33 and 34. The apparatus also includes a walsh rotator 50 for outputting a complex scrambling signal for CDMA modulation, a first multiplier 61 for multiplying an I-complex scrambling signal Is outputted from the walsh rotator 50 and an output signal of the first sum unit 41, a second multiplier 62 for multiplying an I-complex scrambling signal Is outputted from the walsh rotator 50 and an output signal of the second sum unit 42, a third multiplier 63 for multiplying a Q-complex scrambling signal Qs and an output signal of the second sum unit 42, a fourth multiplier 64 for multiplying a Q-complex scrambling signal Qs outputted form the walsh rotator 50 and an output signal of the first sum unit 41, a third sum unit 43 for summing signals outputted from the first and third multipliers 61 and 63 and outputting the result as an I-signal, and a fourth sum unit 44 for summing signals outputted from the second and fourth multipliers 62 and 64 and outputting the result as a Q-signal.

The dedicated physical data channel and the dedicated physical control channel are used in the W-CDMA, and the dedicated data channel transmits voice or data and the dedicated control channel transmits control information. Also, the reverse pilot channel and the reverse fundamental channel are used in the CDMA-2000, the mobile communication terminal transmits the reverse pilot channel for allowing performance of synchronization detection of a base station, and the reverse fundamental channel transmits respective voice and high-speed data.

The operation of the conventional apparatus for increasing channel capacity of a mobile communication system will be briefly described as follows. The information inputted through the respective channels is spread in the first to fourth adders 21 to 24 by the walsh code outputted from the first and second walsh code units 11 and 12 or an orthogonal variable spreading function (OVSF). For the output signal of the first to fourth adders 21 to 24, a predetermined gain is obtained in the first to fourth gain units 31 to 34 then summed in the first and second sum units 41 and 42 through the I or Q channel path and outputted. After performing complex scrambling of combining the signals outputted through the first and second sum units 41 and 42 with the complex scrambling signal outputted from the walsh rotator 50, the signals are outputted as the I-signal and the Q-signal and then filtered.

Figure 4:
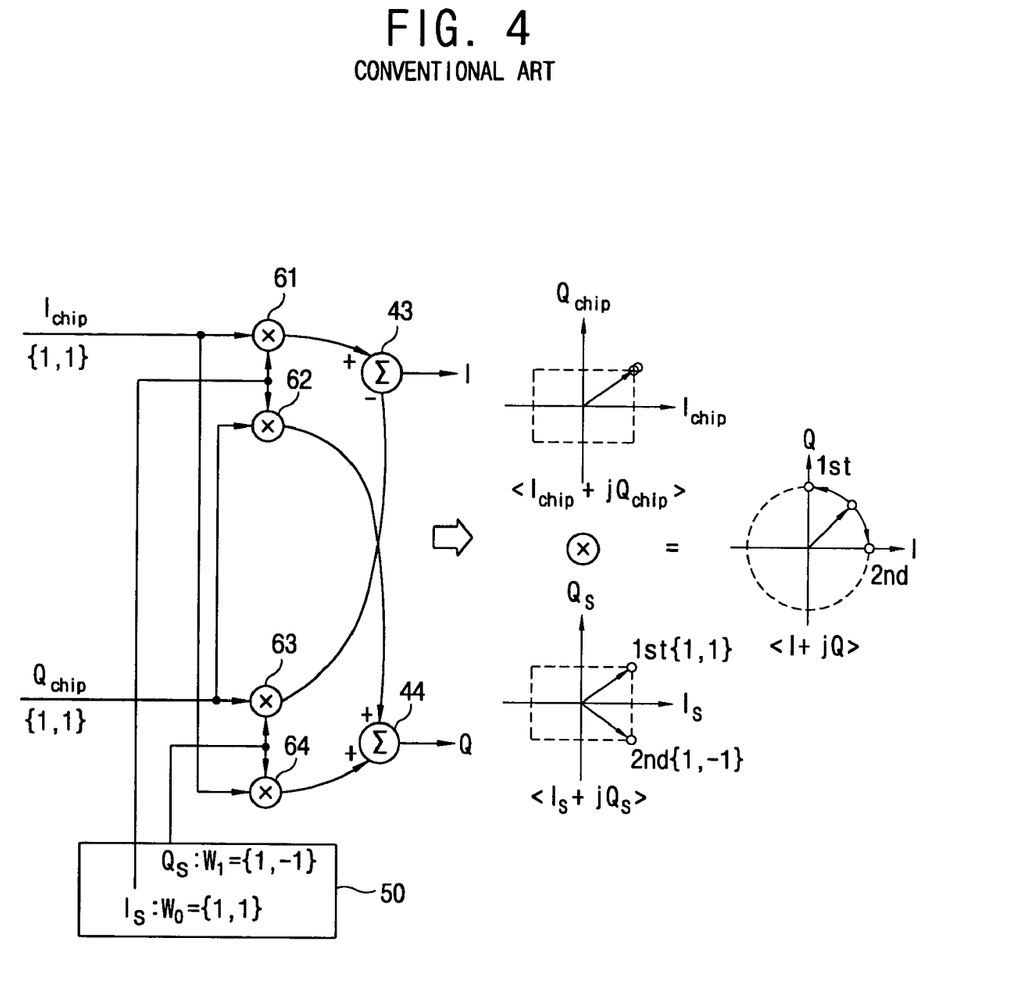
FIG. 4 is a view showing a concept of general complex scrambling.

FIG. 4 is a view illustrating general concept of the complex scrambling. The complex scrambling is performed by operating a vector multiple of a complex data signal ($I_{chip}+jQ_{chip}$) and a complex scrambling signal ($I_s+jQ_s$), and it can be formed as Formula 1.

$$I + jQ = (I_{chip} * I_s - Q_{chip} * Q_s) + j(I_{chip} * Q_s + Q_{chip} * I_s) \quad \text{(Formula 1)}$$
$$= (I_{chip} + jQ_{chip}) * (I_s * jQ_s)$$
$$= A_{chip} * A_s * e^{j(\phi_{chip}+\phi_s)}$$

The $A_{chip}$ and $e^{j\phi_{chip}}$ are a size and an angle of the $I_{chip}+jQ_{chip}$ signal, and the $A_s$ and $e^{j\phi_s}$ are a size and an angle of the $I_s+jQ_s$ signal. Therefore, the size of the I+jQ signal corresponds to the multiplied value of the size of the complex data signal and the complex scrambling signal, and the angle of the I+jQ signal corresponds to a sum of the angles of the complex data signal and the complex scrambling signal.

With reference to FIG. 4, when {1, −1} is inputted for the respective I-complex data signal and the Q-complex data signal, and {1, 1} and {1, −1} are inputted for the I-complex scrambling signal and the Q-complex scrambling signal, will be described as follows. Since the complex data signals are respectively {1, 1}, $I_{chip}+jQ_{chip}$ coordinates values of {1, 1} are repeatedly generated, and the complex scrambling signals are displayed being divided into having respectively {1, 1} and {1, −1} values for the $I_s+jQ_s$ coordinates. When the complex data signal {1, 1} and the complex scrambling signal {1, 1} are multiplied, 45° of the complex data signal and 45° of the complex scrambling signal are added, thereby obtaining a signal having a phase of 90°, and when the complex data signal {1, 1} and the complex scrambling signal {1, −1} are multiplied, 45° of the complex data signal and −45° of the complex scrambling signal are added, thereby obtaining a signal having a phase of 0°. Therefore, the complex scrambling can convert a 0° phase transition generated when two consecutive identical data are inputted into 90° phase transition.

Figure 5:
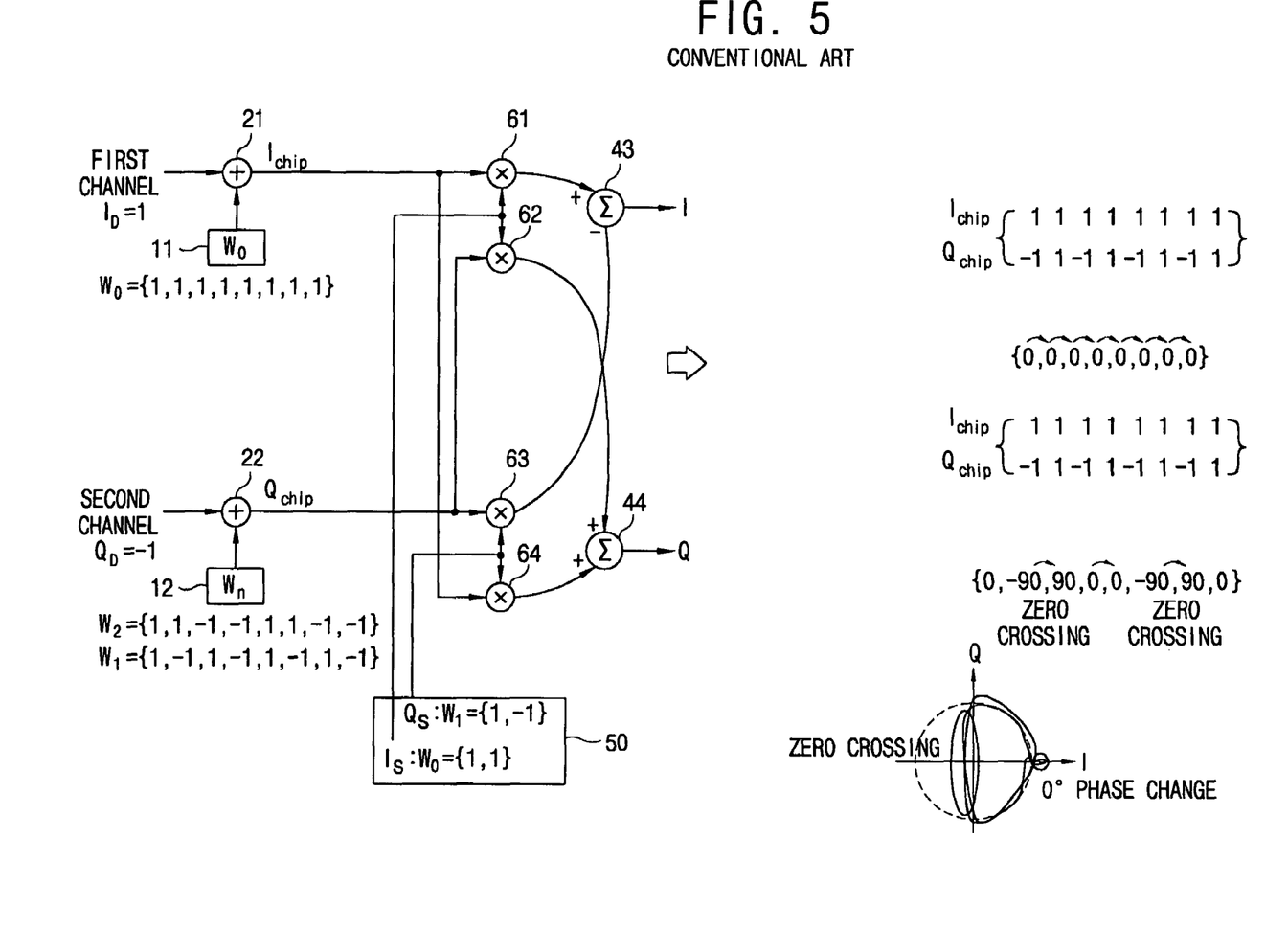
FIG. 5 is a view showing an embodiment of complex scrambling of the apparatus for increasing channel capacity in the mobile communication system in accordance with the conventional art.

FIG. 5 is a view showing an embodiment of the conventional complex scrambling of the apparatus for increasing channel capacity in the mobile communication system. The HPSK using the eighth set walsh code will be descried with reference to FIG. 4.

The eighth set walsh code is a code which is used to spread an actual data ($I_D+jQ_D$). When $I_D=1$ and $Q_D=-1$ are inputted, a $W_0$ code is used for an I channel path, a phase of a final modulation signal (I+jQ) is changed according to which walsh code is used for a Q channel path When the complex scrambling is performed by using $W_n=W_1$ in the Q channel path, all data of the final modulation signal obtain a phase of 0°, and accordingly, overshoot is generated in peak power at every data transition. However, when the complex scrambling is performed by using $W_n=W_1$ in the Q channel path, the data of the final modulation signal has a phase of {0, −90, 90, 0, 0, −90, 90, 0}, and therefore, two times of zero crossing by 180° phase transition and one time of 0° phase transition are generated for data transition. That is, data transition using a walsh code of an even number sequence in $W_X$ can minimize 0° and 180° phase transitions than using a walsh code of an odd number sequence. Therefore, in the HPSK, the complex scrambling is performed by using walsh codes of an even number sequence when consecutive data have identical values. As shown in the above, in the apparatus for increasing channel capacity of the conventional mobile communication system, since an I/Q data has a high peak power when performing 0° or 180° phase transition, the efficiency of the power amplifier is decreased.

To solve the above problem, the apparatus for increasing channel capacity of the conventional mobile communication system which uses the HPSK communication method can not use all walsh codes, but an even sequence walsh code or an odd number sequence walsh code must be restrictively used. Therefore, since the conventional apparatus for increasing channel capacity in the mobile communication system must use a specific walsh code by controlling the number of the walsh code which can be used to send data by using a traffic channel, the transmission rate and capacity is decreased.

The above references are incorporated by reference herein where appropriate for appropriate teachings of additional or alternative details, features and/or technical background

SUMMARY OF THE INVENTION

An object of the invention is to solve at least the above problems and/or disadvantages and to provide at least the advantages described hereinafter.

One embodiment of the present invention solves at least the above problems and/or disadvantages. Another embodiment of the present invention provides an apparatus for increasing channel capacity of a mobile communication system and a method therefore, capable of increasing channel capacity by removing limitations selection of the walsh code generated in a mobile communication system using a hybrid phase shift keying (HPSK). Another embodiment provides an apparatus for increasing channel capacity of a mobile communication system which checks a sequence of the walsh codes respectively inputted to a plurality of channels and selects a set of a repeated complex function outputted from a walsh rotator according to the sequence of the walsh code.

The apparatus for increasing channel capacity of the mobile communication system in accordance with another embodiment of the present invention includes a walsh code control unit for checking sequences of walsh codes respectively outputted from a first walsh code unit and a second walsh code unit. The apparatus also includes a walsh rotator for generating a plurality of repeated complex functions and outputting them and a rotator control unit for selecting the repeated complex functions outputted from the walsh rotator according to the sequence of the walsh codes outputted from the first walsh code unit and the second walsh code unit.

The apparatus for increasing channel capacity of the mobile communication system in accordance with another embodiment of the present invention checks sequences of walsh codes. The apparatus includes a walsh code control unit for checking sequences of walsh codes respectively outputted from a first walsh code unit and a second walsh code unit, a first adder and a second adder for respectively operating adding of walsh codes outputted from the first walsh code unit and the second walsh code unit and data inputted through a first channel path and a second channel path, a walsh rotator for outputting a plurality of repeated complex functions, a first multiplier and a fourth multiplier for multiplying a repeated complex function of the walsh rotator and a complex data signal of the first adder, a second multiplier and a third multiplier for multiplying a repeated complex function of the walsh rotator and a complex data signal of the second adder, a first sum unit for outputting an I signal by summing output signals of the first and second multipliers, a second sum unit for outputting a Q signal by summing output signals of the third and fourth multipliers and a rotator control unit for selecting the repeated complex functions outputted from the walsh rotator according to the sequence of the walsh codes outputted from the first walsh code unit and the second walsh code unit.

Another embodiment provides a method for increasing channel capacity of the mobile communication system. This method includes the steps of checking sequences of walsh codes which are respectively inputted to a plurality of channels and performing complex scrambling by selectively outputting a set of a repeated complex function according to the sequence of the walsh code.

The method for increasing channel capacity of the mobile communication system according to another embodiment outputs a repeated complex function set. This method includes the steps of checking sequences of walsh codes outputted from first and second walsh code units, determining whether the sequences of the walsh codes are all even or odd number sequences, determining whether the sequences of the walsh codes are different as a composition of even and odd number sequences and selectively outputting the repeated complex function set according to the determination result.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 is a view showing a structure of a general walsh code;

DETAILED DESCRIPTION OF THE PREFERRED EMBODIMENTS

Figure 6:
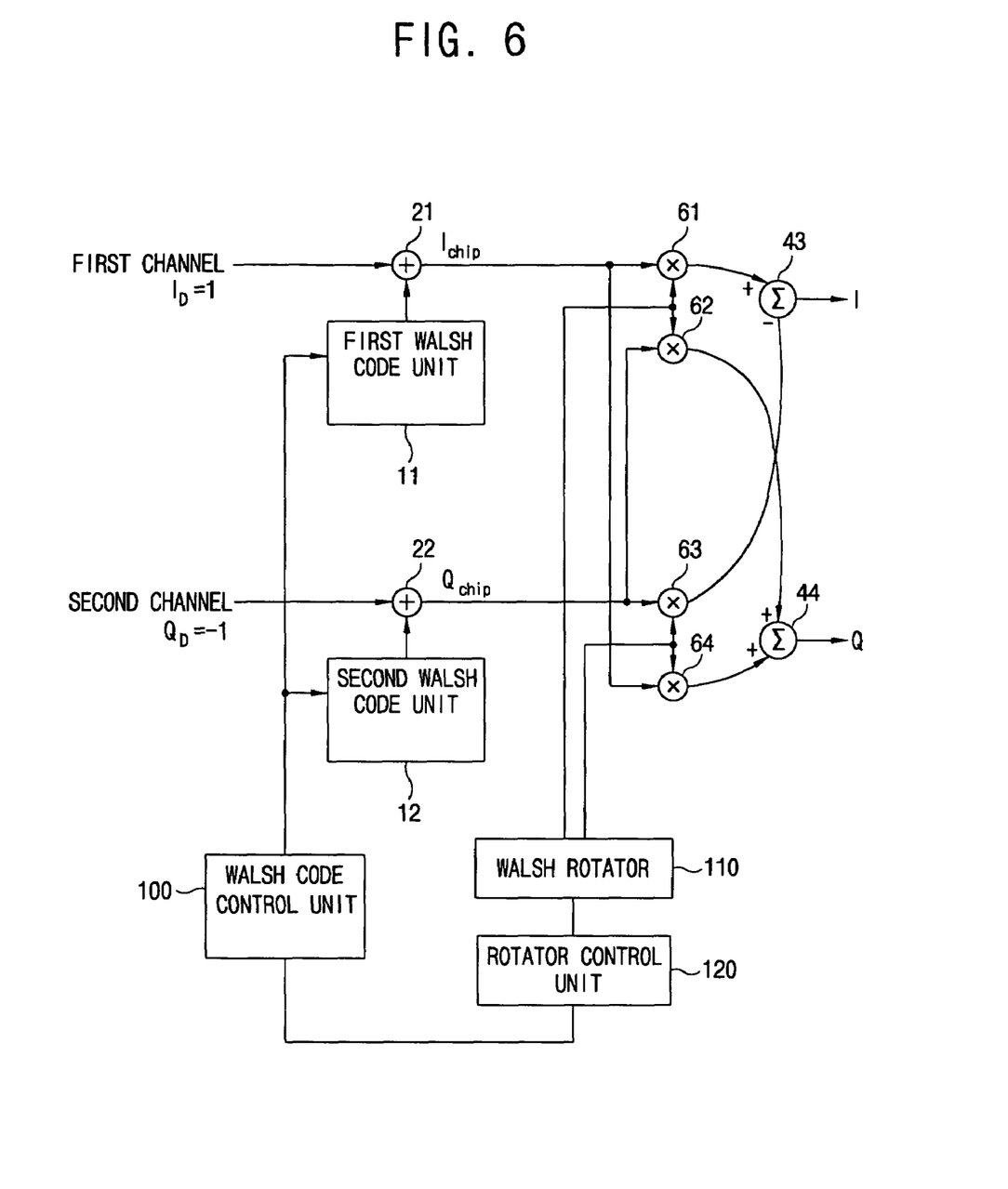
FIG. 6 is a view showing an apparatus for increasing channel capacity in a mobile communication system in accordance with one embodiment of the present invention.

FIG. 6 is a view showing a structure of an apparatus for increasing channel capacity in a mobile communication system in accordance with one embodiment of the present invention. As shown in FIG. 6, the apparatus includes a walsh code control unit 100 for checking sequences of walsh codes respectively outputted from a first walsh code unit 11 and a second walsh code unit 12, a walsh rotator 110 for generating a plurality of repeated complex functions and outputting them to first to fourth multipliers 61 to 64 and a rotator control unit 120 for checking the walsh code outputted to the first walsh code unit 11 and the second walsh code unit 12 through the walsh code control unit 100 and selecting the corresponding repeated complex function.

The walsh code outputted from the first and second code units 11 and 12 is operated with data inputted through the I and Q channel paths in the first and second adders 21 and 22 and then is outputted. The rotator control unit 120 outputs a first set repeated complex function when the walsh code outputted from respective first and second walsh code units 11 and 12 are all identical as even number codes or odd number codes and when the walsh code outputted from respective first and second walsh code units 11 and 12 are different as even and odd number codes, the rotator control unit 120 outputs a second set repeated complex function. The first set repeated complex function is Is={1, 1}, Qs={1, −1} and the second set repeated complex function is Is={1, 1}, Qs={1, 1}. The repeated complex function corresponds to a complex scrambling signal.

Figure 7:
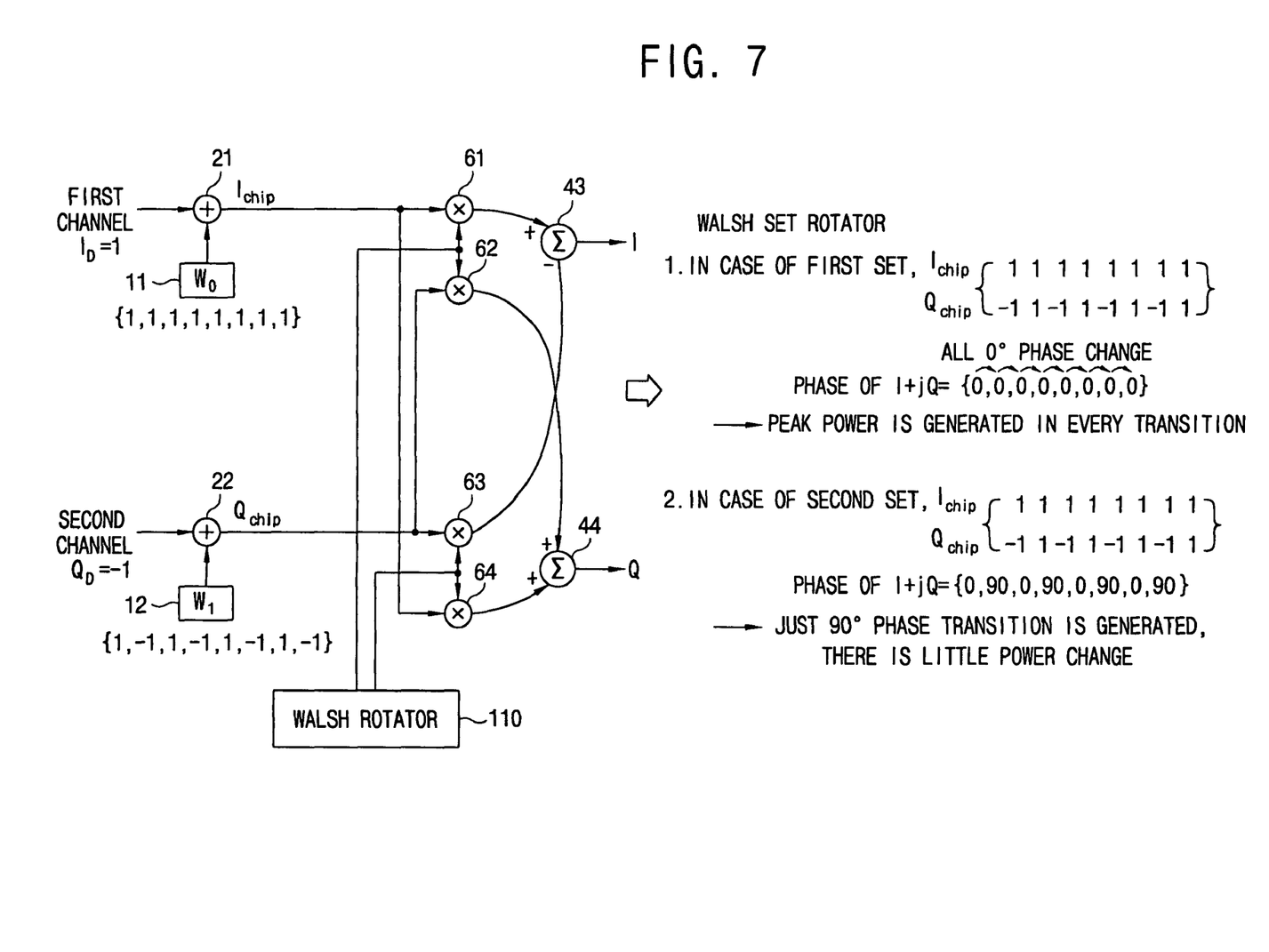
FIG. 7 is a view showing an embodiment of the apparatus for increasing channel capacity in the mobile communication system.

FIG. 7 is a view showing an embodiment of the apparatus for increasing channel capacity in the mobile communication system in accordance with the present invention. The operation of the complex scrambling by using an eighth set walsh code and 2 sets of repeated complex functions will be described as follows.

$I_D=1$ and $Q_D=-1$ are inputted through the I channel path and Q channel path corresponding to first and second channels and a $W_0$ code is inputted to the I channel path and at the same time, a $W_1$ code is inputted to the Q channel path. When the complex scrambling signal outputted from the walsh rotator 110 forms the first set repeated complex function, $I_{chip}=\{1\ 1\ 1\ 1\ 1\ 1\ 1\ 1\}$ and $Q_{chip}=\{-1\ 1\ -1\ 1\ -1\ 1\ -1\ 1\}$ outputted through the first and second adders are outputted as a final modulation signal having a phase of 0°. When the data of the final modulation signal have all 0° phases, overshoot is generated in the peak power of every transition.

When the complex scrambling signal outputted from the walsh rotator 110 forms a second set repeated complex function, the complex data signal outputted through the first adder and second adder is outputted as a final modulation signal having a phase of {0°, 90°, 0°, 90°, 0°, 90°, 0°, 90°} through a complex scrambling process. Since a phase transition of 90° is generated among respective data, power changes hardly occur. That is, when the walsh codes outputted from the first and second walsh code units 11 and 12 are a composition of the even number and odd number codes, it is desirable that the complex scrambling signals outputted from the walsh rotator 110 form a second set repeated complex function.

Figure 8:
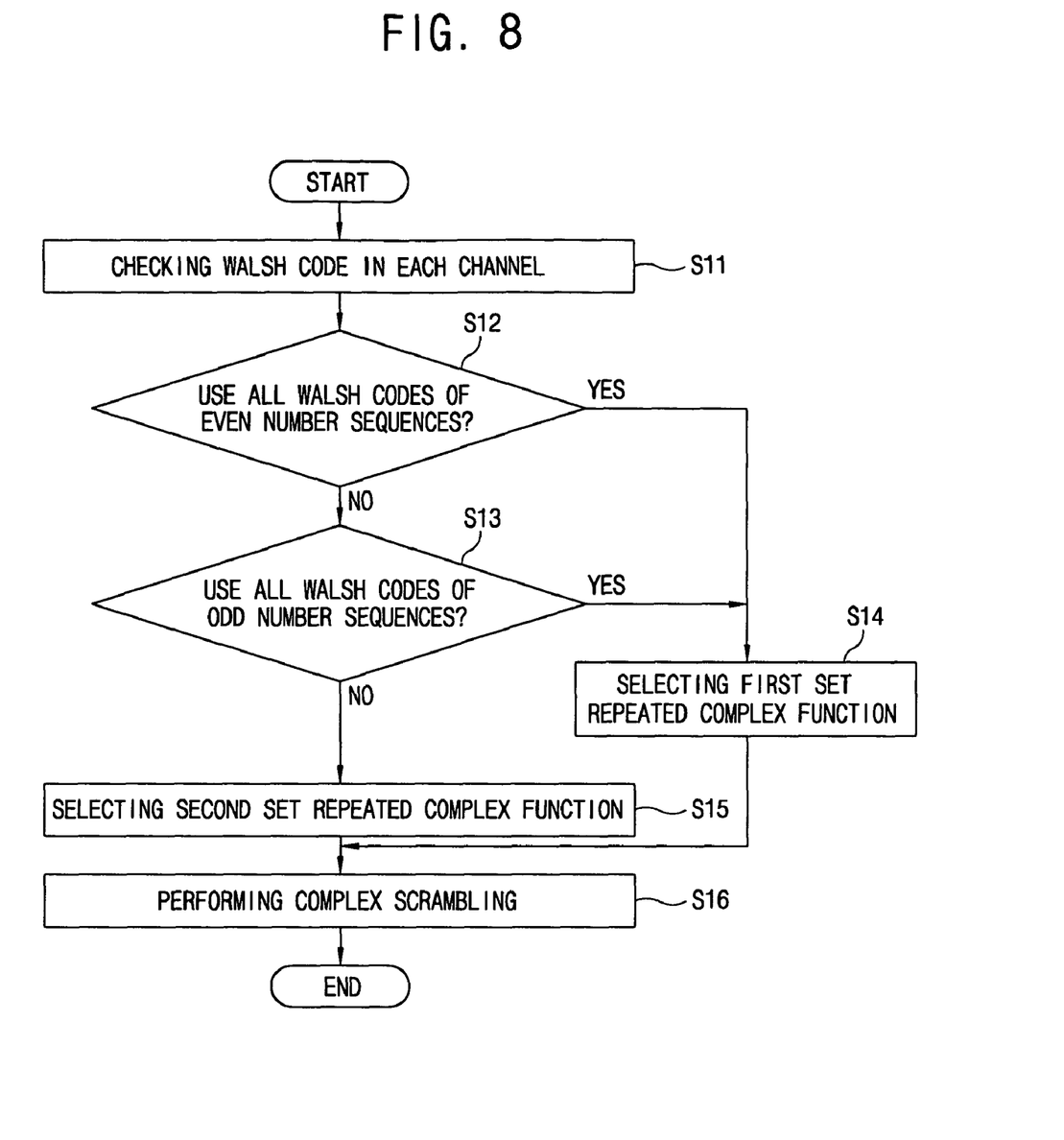
FIG. 8 is a flow chart showing a method for increasing channel capacity in the mobile communication system in accordance with one embodiment of the present invention.

FIG. 8 is a flow chart showing a method for increasing channel capacity in the mobile communication system in accordance with another embodiment of the present invention. The method includes the steps of checking an output status of the walsh code of the first and second walsh code units 11 and 12 built in respective channels with the walsh code control unit and transmitting the status to the rotator control unit 120, determining whether the set numbers outputted to the first walsh code unit 11 and the second walsh code unit 12 are even or odd numbers, outputting a control signal for selecting a repeated complex function in the rotator control unit 120 according to the determination result and performing complex scrambling by outputting the repeated complex function corresponding to the control signal to the first to fourth multipliers 61 to 64 and operating the function with the complex scrambling data inputted through each channel.

When the walsh codes outputted from the first and second walsh code units 11 and 12 are all identical as even or odd number codes, the rotator control unit 120 outputs a control signal ordering outputting of the first set repeated complex function Is={1,1}, Qs={1, −1}. However, when the walsh codes outputted from the first and second walsh code units 11 and 12 are different as even and odd number codes, the rotator control unit 120 outputs a control signal ordering outputting of the second set repeated complex function of Is={1,1}, Qs={1, 1}.

The method for increasing channel capacity in the mobile communication system in accordance with another embodiment of the present invention will be described with reference to FIG. 8. The walsh code control unit 100 checks the sequence of the walsh codes outputted from the first and second walsh code units 11 and 12 and then informs the rotator control unit 120 (S11) of the sequence of the walsh code or the order. The rotator control unit 120 determines whether the set number of the walsh code outputted from the first and second code units 11 and 12 all use even number walsh codes (S12), and when the walsh codes are not even number codes, then again determines whether the walsh codes respectively outputted from the first and second code units 11 and 12 are even number walsh codes (S13).

When the set number of the walsh codes respectively outputted from the first and second code units 11 and 12 are all identical as even or odd numbers, the rotator control unit 120 controls the walsh rotator 110 to output the first set repeated complex function (S14). However, when the set numbers of the walsh codes respectively outputted from the first and second walsh code units 11 and 12 are different as even and odd numbers or odd and even numbers, the rotator control unit 120 controls the walsh rotator 110 to output the second set repeated complex function (S15).

The walsh codes outputted from the first and second walsh code units 11 and 12 are summed with data inputted through the first and second channels in the first and second adders 21 and 22, and then are outputted respectively through I and Q paths. The data outputted through the I and Q paths are called complex scrambling data.

The first to fourth multipliers 61 to 64 performs complex scrambling by using the first and second set repeated complex functions outputted from the walsh rotator 110 and the complex scrambling data (S16). Generally, the HPSK method can minimize a phase change of 0° and a phase change of 180° when compared with the QPSK method, and deliver an average level of the output power. However, since the walsh codes are limited, the channel capacity of the mobile communication system is limited. That is, when the walsh codes generated in the first and second channels are even number sequences and the walsh codes generated in the first and second channels are odd number sequences, the phase change of 0° is generated increasing the peak power. When the walsh codes generated in the first and second channels are identical as odd or even number codes, the 0° and 180° phase changes are reduced decreasing the peak power. Therefore, the method of performing complex scrambling by applying respectively different repeated complex functions based on whether the walsh codes generated in the first and second channels are identical as odd or even number codes or the walsh codes are different as even and odd number codes.

The apparatus for increasing channel capacity in the mobile communication system and the method therefor in accordance with one embodiment of the present invention can perform complex scrambling by selectively outputting the first or second set repeated complex functions according to the sequence of the walsh codes outputted from the first and second walsh code units, allows all walsh codes to be utilized and increases the reverse channel capacity. Also, the apparatus for increasing channel capacity in the mobile communication system and the method therefor in accordance with one embodiment of the present invention can reduce output power changes since the peak power is uniform by uniform phase change and increase efficiency of the output power amplifier, and at the same time, can be implemented by using an output amplifier with a low output.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for increasing channel capacity of a mobile communication system, comprising:
    a walsh code control unit to check sequences of walsh codes respectively outputted from a first walsh code unit and a second walsh code unit;
    a walsh rotator to generate and output a plurality of repeated complex functions; and
    a rotator control unit to select the repeated complex functions output from the walsh rotator based on the sequences of the walsh codes outputted from the first walsh code unit and the second walsh code unit.

2. The apparatus of claim 1, wherein the walsh code control unit is connected to the rotator control unit and transmits a status of the walsh code that is output from the first and second walsh code units.

3. The apparatus of claim 1, wherein the walsh code control unit outputs a first repeated complex function to the walsh rotator when the walsh codes output from the first walsh code unit and the second walsh code unit are one of all even number and all odd number sequences, and outputs a second repeated complex function to the walsh rotator when the walsh codes output from the first walsh code unit are one of even number and odd number sequences and the second walsh code unit are one of odd number and even number sequences respectively.

4. The apparatus of claim 3, wherein the first repeated complex function is Is={1, 1}, Qs={1, −1}.

5. The apparatus of claim 3, wherein the second repeated complex function is Is={1, 1}, Qs={1, 1}.

6. An apparatus for increasing channel capacity of a mobile communication system, comprising:
   a walsh code control unit to check sequences of walsh codes respectively output from a first walsh code unit and a second walsh code unit;
   a first adder and a second adder to respectively add the walsh codes output from the first walsh code unit and the second walsh code unit and data input through a first channel path and a second channel path;
   a walsh rotator to output a plurality of repeated complex functions;
   a first multiplier and a fourth multiplier to multiply of one of the repeated complex functions of the walsh rotator and a complex data signal of the first adder;
   a second multiplier and a third multiplier to multiply one of the repeated complex functions of the walsh rotator and a complex data signal of the second adder;
   a first sum unit to output an I signal by summing output signals of the first and second multipliers;
   a second sum unit to output a Q signal by summing output signals of the third and fourth multipliers;
   and a rotator control unit to select one of the plurality of repeated complex functions output from the walsh rotator based the sequences of the walsh codes output from the first walsh code unit and the second walsh code unit.

7. The apparatus of claim 6, wherein the rotor control unit outputs a repeated complex function of Is={1, 1}, Qs={1, −1} when the sequences of the walsh codes respectively output from the first and second walsh code units are all one of even number and odd number sequences.

8. The apparatus of claim 6, wherein the rotor control unit outputs a repeated complex function of Is={1, 1}, Qs={1, 1} when the sequences of the walsh codes respectively output from the first and second walsh code units are different even number and odd number sequences.

9. A method for increasing channel capacity of a mobile communication system, comprising:
   checking sequences of walsh codes of a plurality of channels;
   determining whether the sequences of the walsh codes are all one of even and odd number sequences;
   determining whether the sequences of the walsh codes are different even and odd number sequences; and
   performing complex scrambling by selectively outputting a set of a repeated complex function according to the sequences of the walsh code.

10. The method of claim 9, wherein when the sequences of the walsh codes are all one of even and odd number sequences, complex scrambling is performed by using a first repeated complex function.

11. The method of claim 10, wherein the first repeated complex function is Is={1, 1}, Qs={1, −1}.

12. The method of claim 9, wherein when the sequences of the walsh codes are different even and odd number sequences, complex scrambling is performed by using a second repeated complex function.

13. The method of claim 12, wherein the second repeated complex function is Is={1, 1}, Qs={1, 1}.

14. A method for increasing channel capacity of a mobile communication system, comprising:
   checking sequences of walsh codes output from first and second walsh code units;
   determining whether the sequences of the walsh codes are all one of even and odd number sequences;
   determining whether the sequences of the walsh codes are different compositions of even and odd number sequences; and
   selectively outputting a repeated complex function set according to the determination result.

15. The method of claim 14, wherein selectively outputting comprises:
   outputting a first repeated complex function when the sequences of the walsh codes are all one of even and odd number sequences; and
   outputting a second repeated complex function when the sequences of the walsh codes are different even and odd number sequences.

16. The method of claim 15, wherein the first repeated complex function is Is={1, 1}, Qs={1, −1}.

17. The method of claim 15, wherein the second repeated complex function is Is={1, 1}, Qs={1, 1}.

* * * * *